J. JANDASEK.
TRACTOR.
APPLICATION FILED NOV. 14, 1918.

1,415,356.

Patented May 9, 1922.
4 SHEETS—SHEET 1.

Inventor
Joseph Jandasek

By Whittemore Hulbert & Whittemore
Attorneys

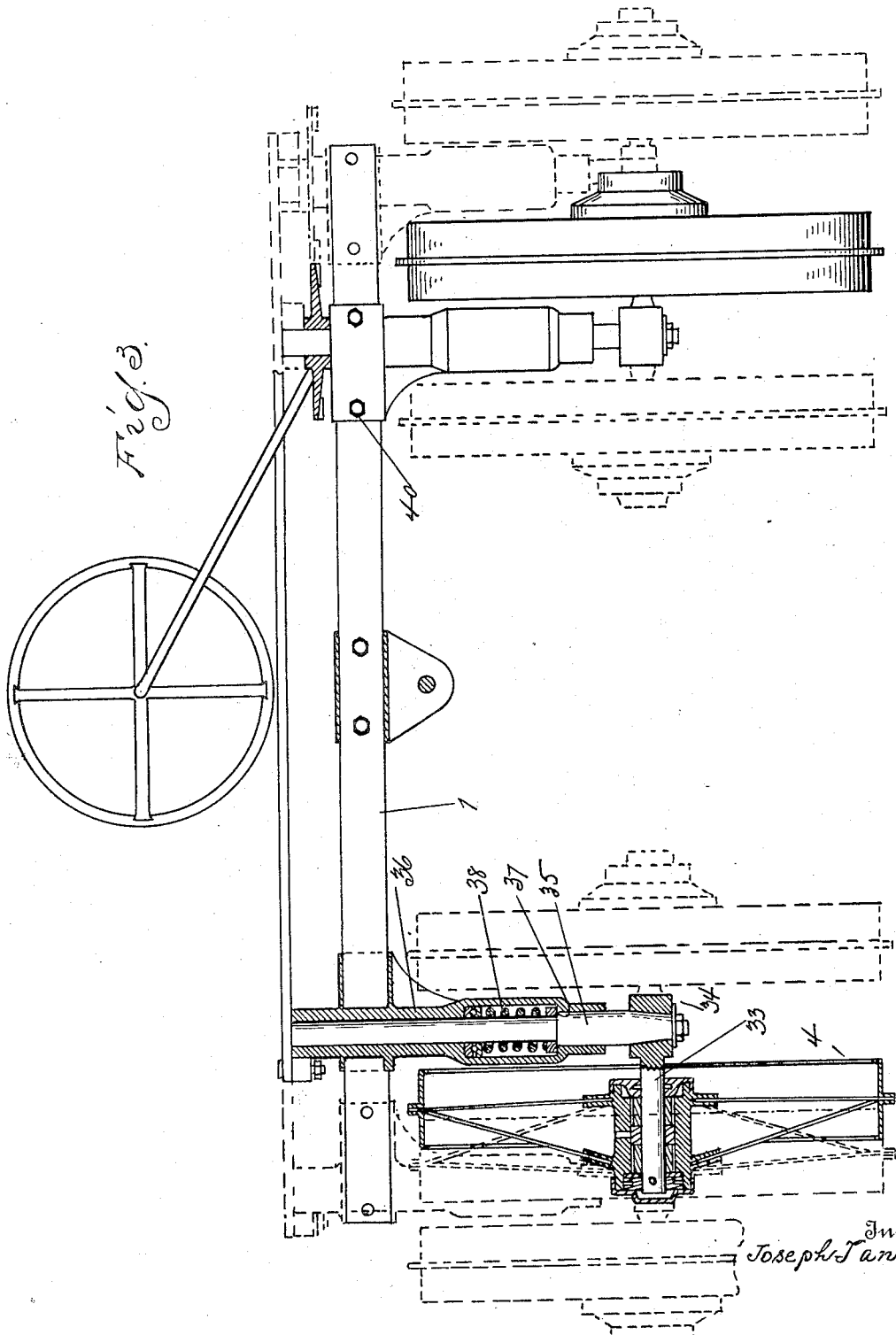

J. JANDASEK.
TRACTOR.
APPLICATION FILED NOV. 14, 1918.
1,415,356.
Patented May 9, 1922.
4 SHEETS—SHEET 3.
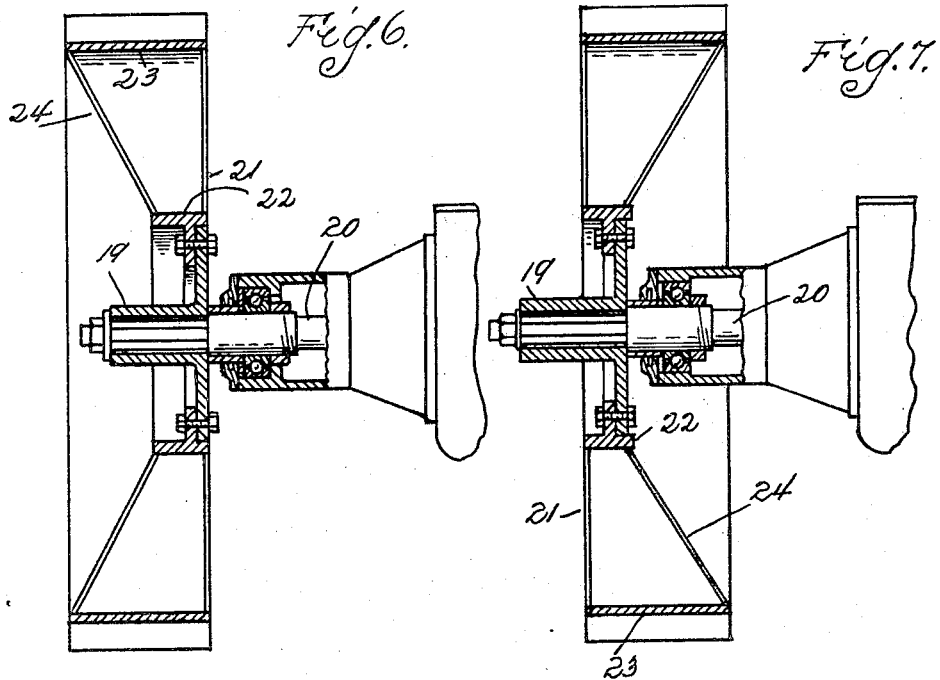
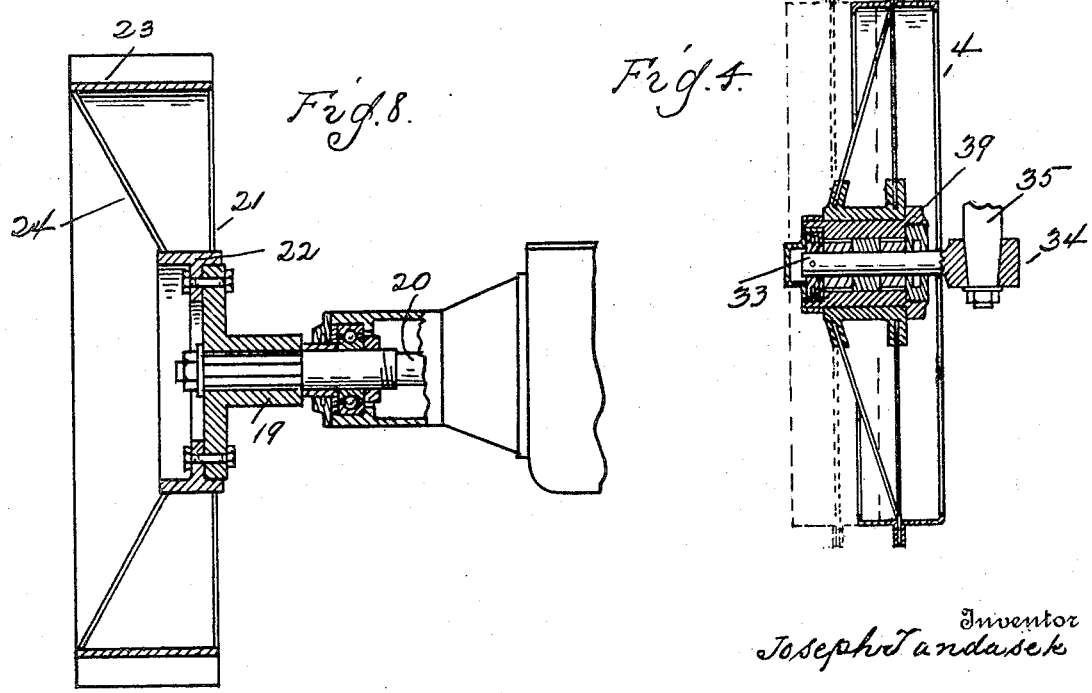
Inventor
Joseph Jandasek
By Whittemore Hulbert & Whittemore
Attorneys J. JANDASEK.
TRACTOR.
APPLICATION FILED NOV. 14, 1918.
1,415,356.
Patented May 9, 1922.
4 SHEETS—SHEET 4.
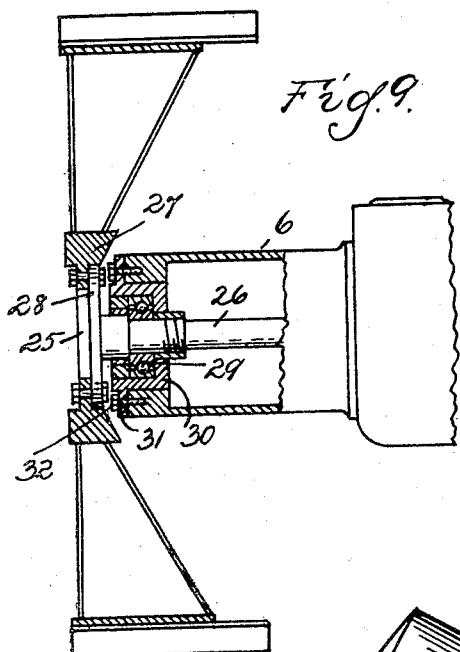
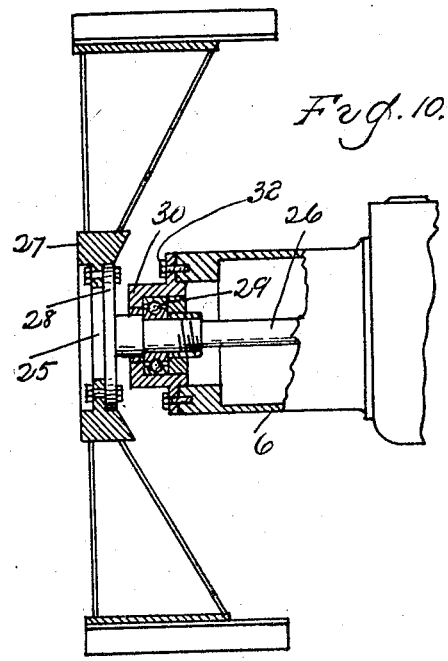
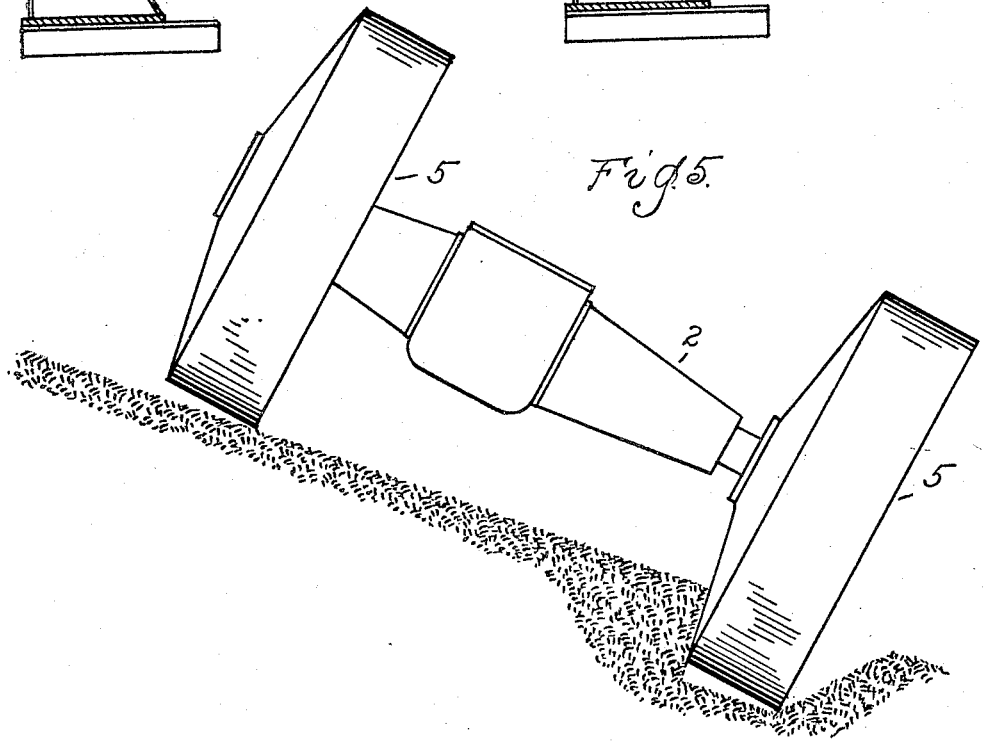
Inventor
Joseph Jandasek
By Whittemore Hulbert & Whittemore
Attorneys

UNITED STATES PATENT OFFICE.

JOSEPH JANDASEK, OF DETROIT, MICHIGAN, ASSIGNOR TO PAIGE-DETROIT MOTOR CAR COMPANY, OF DETROIT, MICHIGAN, A CORPORATION OF MICHIGAN.

TRACTOR.

1,415,356.   Specification of Letters Patent.   Patented May 9, 1922.

Application filed November 14, 1918. Serial No. 262,442.

*To all whom it may concern:*

Be it known that I, JOSEPH JANDASEK, a subject of the Emperor of Austria, residing at Detroit, in the county of Wayne and State of Michigan, have invented certain new and useful Improvements in Tractors, of which the following is a specification, reference being had therein to the accompanying drawings.

The invention relates to motor vehicles and is designed for use particularly in tractors. One of the objects of the invention is to obtain a construction in which the distance between the wheel treads is varied by having the wheels laterally adjustable relative to the axle upon which they are mounted; first, by having a construction in which the wheels are reversibly mounted on the axle; secondly, by having a construction in which the wheels have rim sections reversibly mounted on their hubs and; thirdly, by having a construction in which the bearing container between the axle and its housing is reversible. Other objects of the invention reside in the novel arrangements and combinations of parts as more fully hereinafter set forth.

In the drawings:

Figure 3 is a front elevation partly in section of the front axle;

Figure 4 is a sectional view of a modified construction of front wheel;

Figure 5 is a rear elevation of the rear axle, showing one of the wheels in a laterally adjusted position;

Figures 6, 7 and 8 are sectional elevations of a portion of a modified construction of rear axle and wheel thereon;

Figures 9 and 10 are sectional elevations of a portion of another modified construction of rear axle and wheel thereon.

Figure 1:
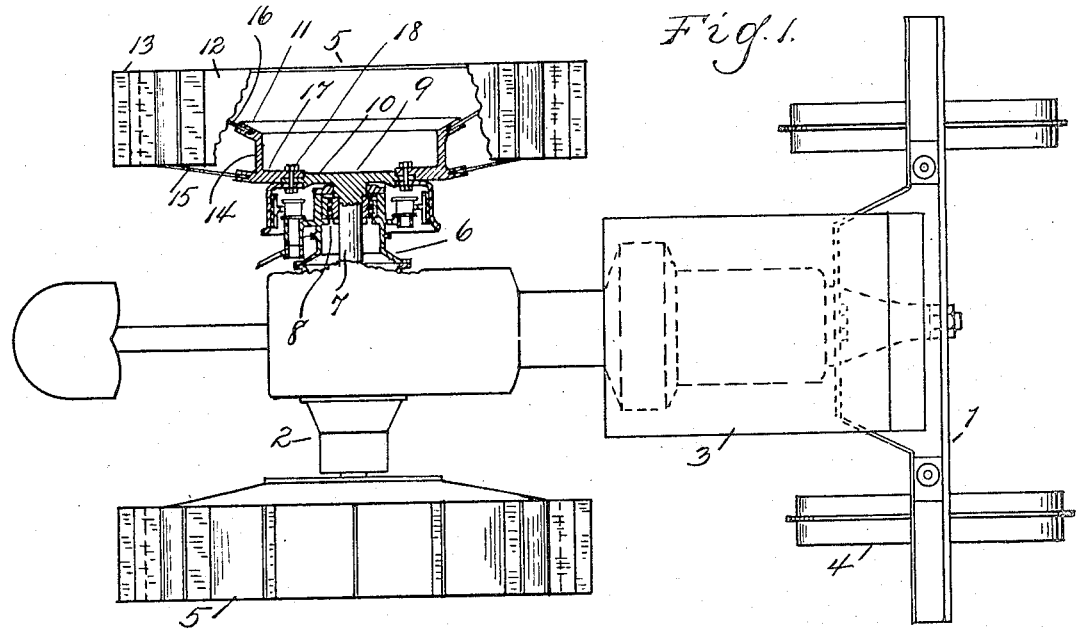
Figure 1 is a top plan view partly in section of the construction, embodying my invention.

1 is the front axle, 2 the rear axle, 3 the body connecting the front and rear axles, 4 the front wheels mounted on opposite ends of the front axle, and 5 the rear wheels mounted on opposite ends of the rear axle, which comprises the housing 6 and the drive shaft 7 journalled in suitable anti-friction bearings 8 at opposite ends of the housing. Each of the rear wheels 5 comprises the hub 9 having the annular flange 10 at one end and the rim section 11 upon the annular flange 10. This rim section comprises the tread 12, to which are secured the spuds 13, the concentric inner annular ring 14 upon the annular flange 9 and the spokes 15 and 16 connecting the tread and inner ring near their edges. The tread 12 is of greater width than the inner ring 14 so that the tread has a portion located to one side of the inner ring. The inner ring is provided with the annular inwardly-extending flange 17, which is connected to the annular flange 10 by means of the bolts 18.

Figure 2:
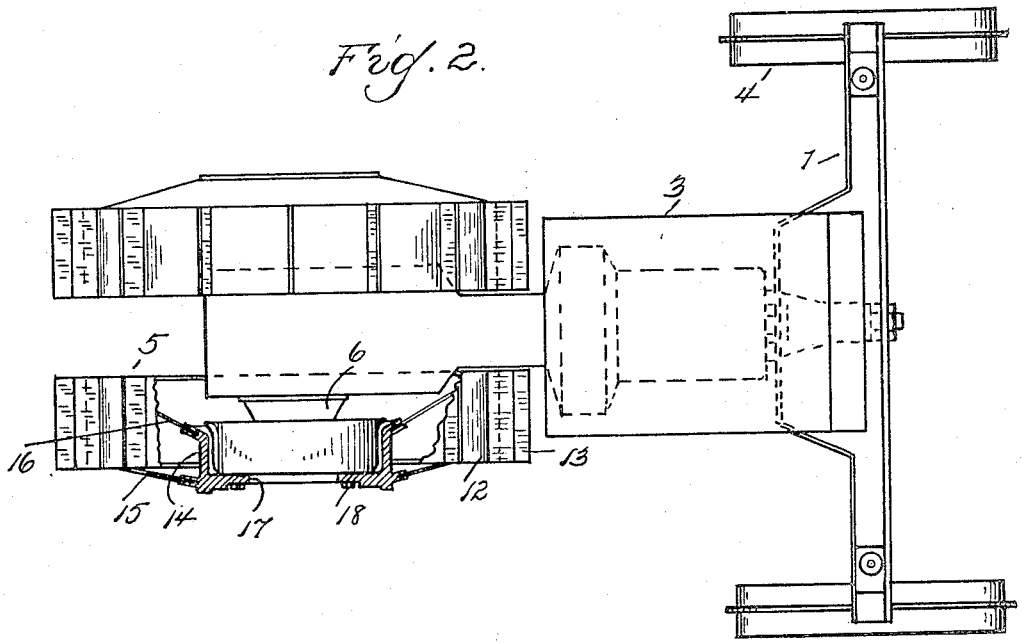
Figure 2 is a similar view showing the wheels in adjusted positions.

As shown in Figures 1 and 2 the hub 9 is integral with the drive shaft 7. For the purpose of varying the distances between the treads of the rear wheels the rim sections 11 are reversibly mounted upon their hubs 9. The body 3 is also arranged to permit of the reversal of the rim sections.

Figures 6, 7 and 8 show a modified construction of axle and wheel which differ from the construction shown in Figures 1 and 2 by having the hub 19 reversibly mounted upon the drive shaft 20 and also by having the spokes 21 extend perpendicular to the inner ring 22 and tread 23 and the spokes 24 incline outwardly from the inner ring to the tread. For the purpose of varying the distances between the rear wheels, the hub 19 is reversibly mounted on the drive shaft 20. The rim section of each wheel is reversibly mounted upon its hub, and further, the inner ring 22 is adapted to be secured to either side of the annular flange of the hub. Figure 6 shows the inner ring 22 secured to the annular flange of the hub on the latter's outer face. Figure 7 shows the rim section reversed and its inner ring secured to the annular flange of the hub on its outer face. Figure 8 shows the hub 19 reversed upon the shaft with the rim section reversed and its inner ring secured to the normal inner face of the annular flange of the hub. It is apparent that by this arrangement I am enabled to obtain various distances between the rear wheels by either reversing the complete wheel upon the axle, reversing the rim section upon the hub, or reversing the hub upon the axle and relative to the rim section.

Figures 9 and 10 show modified constructions in which there is the hub 25 on the outer end of the drive shaft 26 and the inner annular ring 27 secured to the annular flange 28 upon the hub. This rim section is adapted to be reversed and can be secured to either face of the annular flange. 29 is an anti-friction bearing between the shaft 26 and the axle housing 6, and 30 is a container for the bearing. This container is provided with the outwardly-extending flange 31, which is adapted to be secured to the end of the axle housing by means of the cap bolts 32. This container is reversibly mounted in the axle housing 6 and Figures 9 and 10 show the same in its two positions of adjustment.

For the purpose of varying the distance between the front wheels 4, as shown in Figures 1, 2 and 3, the latter are mounted upon the lateral pivots 33 upon the steering knuckles 34, which have the vertically extending portions 35 extending upward through the bearings 36 adjustably mounted upon the front axle 1 near its opposite ends. These vertically-extending portions 35 are rotatable so that the lateral pivots 33 may either extend inward or outward and the front wheels 4 may either be within the plane of the bearings 36 or be outside the plane thereof. As shown, the vertically-extending portions 35 of the steering knuckles have the shoulders 37 against which suitable coil springs 38 abut, these coil springs being housed within the bearings 36 and resisting upward movement of the vertically-extending portions.

For securing further lateral adjustment of the wheels, they are reversibly mounted upon their pivots, their rim sections are reversibly mounted upon their hubs, and the bearing container 39, shown in Figure 4, is reversibly mounted. Further, the bearings 36 for the steering knuckles are adjustable longitudinally of the front axle and can be locked in their various positions of adjustment by the bolts 40.

It is readily seen that the above arrangements permit of several variations in distance between both the front and rear wheels of the vehicle, which in the present instance is a tractor, so that the tractor can be used in fields having different distances between rows without running over any of the rows by simply adjusting the wheels. With this construction it is possible to use one of the front wheels of the tractor for guiding the tractor when used in plowing by adjusting that wheel to run in the furrow and be guided by the furrow bank. Further, as shown in Figure 5, the center of gravity of the tractor can be varied to make the tractor more stable when used on a hill side by laterally adjusting the lower rear wheel outward.

What I claim as my invention is:

1. In a motor vehicle, the combination with an axle, and a wheel mounted on said axle, of an axle housing, and a reversible bearing container between said axle and housing.

2. In a motor vehicle, the combination with an axle, a hub at one end thereof and a rim section reversibly mounted on said hub, of an axle housing, a bearing between said axle and housing, and a container for said bearing reversibly mounted in said housing, for the purpose described.

3. In a motor vehicle, the combination with an axle and bearings thereon, of steering knuckles engaging said bearings, lateral pivots upon said steering knuckles, wheels upon said pivots rotatable to be within or without the planes of their respective bearings, thereby varying the distance between said wheels.

4. In a motor vehicle, the combination with an axle, of a hub section reversibly mounted upon said axle, a rim and spoke section reversibly mounted upon said hub section and provided with a tread portion, and means for securing said rim and spoke section to said hub section, the central plane of said tread portion being offset from said securing means.

In testimony whereof I affix my signature.

JOSEPH JANDASEK.